United States Patent [19]
Ohsuga et al.

[11] Patent Number: 4,746,973
[45] Date of Patent: May 24, 1988

[54] FOCUS BLOCK FOR A THREE-TUBE COLOR VIDEO PROJECTOR

[75] Inventors: Satoshi Ohsuga, Saitama; Masayuki Ohmori; Yasunobu Kawahata, both of Tokyo, all of Japan

[73] Assignee: Sony Corporation, Tokyo, Japan

[21] Appl. No.: 48,620

[22] Filed: May 11, 1987

[30] Foreign Application Priority Data

May 14, 1986 [JP] Japan .............................. 61-072534[U]

[51] Int. Cl.$^4$ .............................................. H04N 9/31
[52] U.S. Cl. ....................................... 358/60; 358/65
[58] Field of Search ............................. 358/60, 64, 65

[56] References Cited

U.S. PATENT DOCUMENTS

| | | | |
|---|---|---|---|
| 4,051,514 | 9/1977 | Suzuki et al. | 358/65 |
| 4,219,843 | 8/1980 | Takahashi | 358/60 |
| 4,599,641 | 7/1986 | Troiano | 358/65 X |
| 4,599,651 | 7/1986 | Rodda | 358/65 X |
| 4,631,576 | 12/1986 | St. John | 358/64 X |

Primary Examiner—James J. Groody
Assistant Examiner—E. Anne Faris
Attorney, Agent, or Firm—Hill, Van Santen, Steadman & Simpson

[57] ABSTRACT

A focus block for a 3-tube color video projector which has a focus block section for the red color, a focus block section for the green color, and a focus block section for the blue color and each has a focus adjusting circuit and a brightness adjusting circuit which are connected in series the intermediate connecting points between each focus adjusting circuit and each brightness adjusting circuit of the focus block sections are connected together.

7 Claims, 3 Drawing Sheets

FOCUS BLOCK FOR A THREE-TUBE COLOR VIDEO PROJECTOR

BACKGROUND OF THE INVENTION

1. Field of the Invention

The present invention relates to a focus block which is suitable for a three-tube color video projector, for example.

According to the present invention, there is provided a focus control for a three-tube color video projector in which intermediate connecting points between a focus adjusting circuit and a brightness adjusting circuit of each focus block which supplies a focus voltage and a G2 voltage to an associated cathode-ray tube are connected together, thereby eliminating distortion of the color balance due to stray currents and discharges occurring in any of the cathode-ray tubes.

2. Description of the Prior Art

A color video projector 1 is shown in FIG. 5 and includes three cathode-ray tubes (CRT's) 10, 11 and 12 with one for the red color, one for the green color and one for the blue color which generate red, blue and green image light beams L1, L2 and L3, which are projected onto a screen 13 to display a color image.

The color video projector 1 includes a focus block 2 shown in FIG. 4 for adjusting the electron guns 10, 11 and 12 of the CRT's 10, 11 and 12.

The focus block 2 has a red focus block section 3, a green focus block section 4, and a blue focus block section 5. The focus block section 3, 4 and 5 are connected in parallel with sides grounded and the other sides are connected to a protecting register R1 which has its other side connected to an intermediate point where half the voltage is attained of a high-voltage power source HV/2 which is obtained from a fly-back transformer (not shown).

The focus block sections 3, 4 and 5 separately control the red, green and blue colors so that the focus adjustments and the brightness adjustments can be independently achieved in consideration of the different characteristics among the corresponding CRT's 10, 11 and 12.

The focus block section for red 3 comprises a focus adjusting circuit 3A which has connected in series a fixed resistor $R_{R1}$, a focus adjusting variable resistor $VR_{R1}$, and a fixed resistor $R_{R2}$. A brightness adjusting circuit 3B is connected in series with circuit 3A and has a brightness adjusting variable resistor $VR_{R2}$ and a fixed resistor $R_{R3}$ which are serially connected.

In the focus block section 3 for the red color, the focus adjusting variable resistor $VR_{R1}$ of the focus adjusting circuit 3A and the brightness adjusting variable resistor $VR_{R2}$ of the brightness adjusting circuit 3B have wiper contacts which are connected to output terminals $A_R$ and $B_R$, respectively, which supply the focus control voltage and the G2 voltage to the focus adjusting electrode which is the 4th grid G4 and the brightness adjusting electrode, which is the 2nd grid G2 of the CRT 10 for the red color as shown in FIGS. 5 and 6. When the wiper contact of the focus adjusting variable resistor $VR_{R1}$ and the wiper contact of the brightness adjusting variable resistor $VR_{R2}$ are adjusted, the focus and the brightness of the spot of the red beam on the screen 13 of the CRT 10 are adjusted.

The focus block section for the green color 4 is configured to comprise a series connection between resistor R1 and ground of a focus adjusting circuit 4A which has a fixed resistor $R_{G1}$, a focus adjusting variable resistor $VR_{G1}$ which has a variable contact and a fixed resistor $R_{G2}$ are serially connected and a brightness adjusting circuit 4B which includes a brightness adjusting variable resistor $VR_{G2}$ with a variable contact and a fixed resistor $R_{G3}$ which are serially connected. The focus block for the blue color 5 is configured to comprise a series connection of a focus adjusting circuit 5A which has a fixed resistor $R_{B1}$, a focus adjusting variable resistor $VR_{B1}$ with a variable contact, and a fixed resistor $R_{B2}$ which are serially connected and a brightness adjusting circuit 5B which has a brightness adjusting variable resistor $VR_{B2}$ with a variable contact and a fixed resistor $R_{B3}$ which are serially connected between R1 and ground.

In the focus block sections 3, 4 and 5 for the red, green and blue colors, when the wiper contacts of the focus adjusting variable resistors $VR_{R1}$, $VR_{G1}$ and $VR_{B1}$ of the focus adjusting circuits 3A, 4A and 5A respectively are individually adjusted, the focus of the beam spots of each of the corresponding CRT's 10, 11 and 12 will be adjusted; and when the color balance of the screen 13 is adjusted by moving the variable contacts of the brightness adjusting variable resistors $VR_{R2}$, $VR_{G2}$ and $VR_{B2}$ of the brightness adjusting circuits 3B, 4B and 5B respectively, the overall color balance of the color video projector 1 will be adjusted.

As shown in FIG. 6, the electron guns in the neck sections of each of the CRT's 10, 11 and 12, has a cathode K, pre-focal lenses G1 and G2, and main focus lenses G3, G4 and G5.

The G2 electrode of the pre-focal lens receives the voltage G2 applied from the focus block 2 from a G2 voltage output terminal $B_R$, $B_G$ or $B_B$, for adjusting the brightness.

The electrodes G3 and G5 of the main focus lenses are supplied with a high voltage, and the electrode G4 of each tube is supplied with a focus voltage which is a low voltage supplied from the focus block 2 at the focus voltage output terminal $A_R$, $A_G$ or $A_B$. This system forms an electro-optical system and enables adjustments of the focus of the color beam spots on each of the CRT's 10, 11 or 12 by use of the focus voltage.

Conventionally, however, in the focus block of the prior art, there is a problem in that in the primary focus lenses G3, G4 and G5 of the corresponding CRT's 10, 11 and 12, when the low-voltage focus electrode section G4 becomes contaminated due to deterioration of the CRT or when burrs or dirt occur cold emission occurs in the high-voltage electrode sections G3 and G5 of the tubes and such cold emission subsequently hits the neck section 14.

This causes a stray current $I_s$ to flow from the high-voltage section G3 and/or G5 to the focus electrode section G4. The stray current $I_s$ flows from the focus electrode section G4 through the focus voltage output terminal $A_R$, $A_G$ or $A_B$ into the focus adjusting circuit 3A, 4A or 5A of the corresponding focus block section of the focus block 2 and also flows through the brightness adjusting circuit 3B, 4B or 5B, which causes an increase in the voltage G2 which is obtained from the G2 voltage output terminal $B_R$, $B_G$ or $B_B$ of the corresponding brightness adjusting circuit 3B, 4B or 5B.

As a result, the color balance is distorted during operation even if each of the G2 voltages at the output terminals $B_R$, $B_G$ or $B_B$ of the variable registers $VR_{R2}$, $VR_{G2}$ or $VR_{B2}$ of the brightness adjusting circuits 3B, 4B or 5B for the red, green and blue color respectively are adjusted initially so as to establish good balance. Consequently, for example, when the voltage G2 for the red color is increased, the overall image projected onto the screen 13 becomes reddish; furthermore, since the focus voltage is also increased, the image is defocused on the CRT 10 for the red color.

Consequently, when stray current $I_s$ is caused as described above and the color balance is distorted, the variable resistor $VR_{R1}$, $VR_{G1}$ or $VR_{B1}$ of the corresponding focus adjusting circuit 3A, 4A or 5A of the CRT's 10, 11 or 12 in which the stray current $I_s$ is flowing in the focus block 2 must be readjusted, and also it is necessary to readjust the brightness to obtain good balance for the CRT's 10, 11 and 12 for the red, green and blue color by adjusting the wiper contacts of the variable registers $VR_{R2}$, $VR_{G2}$ and $VR_{B2}$.

SUMMARY OF THE INVENTION

It is therefore an object of the present invention to solve the problems described above by providing a focus block circuit capable of effectively preventing the color balance from being deteriorated even when stray current or a discharge phenomenon occurs.

To solve these problems, according to the present invention, there is provided a focus block in a 3-tube color video projector which has a focus block for the red color, a focus block for the green color, and a focus block for the blue color and each includes a focus adjusting circuit and a brightness adjusting circuit connected in series together and wherein the intermediate connecting point between each of said focus adjusting circuits and each of said brightness adjusting circuits are connected together.

In the invention, even when a stray current $I_s$ or a discharge phenomenon occurs in any one of the cathode-ray tubes 10, 11 and 12 for the red, blue and green color and such current flows into a focus voltage output terminal of the corresponding focus block section 3, 4 or 5 of the focus block 2 since the intermediate connection points $C_R$, $C_G$ and $C_B$ between the adjusting circuits 3A, 4A and 5A and the focus adjusting circuits 3B, 4B and 5B are connected together, distortion of the color balance due to a change in the voltage G2 obtained at the G2 voltage output terminal $B_R$, $B_G$ and $B_B$ of the brightness adjusting circuits 3B, 4B and 5B does not occur.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
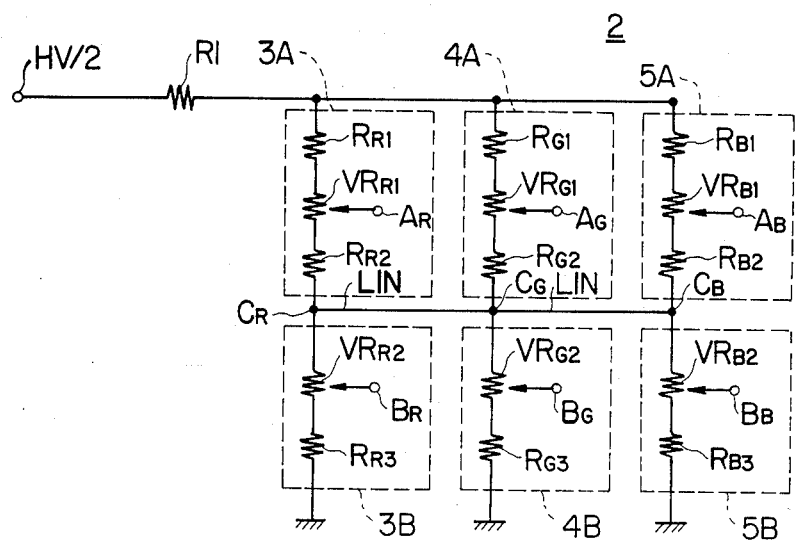
FIG. 1 is a circuit diagram illustrating a first embodiment of a focus block according to the present invention.
Figure 4:
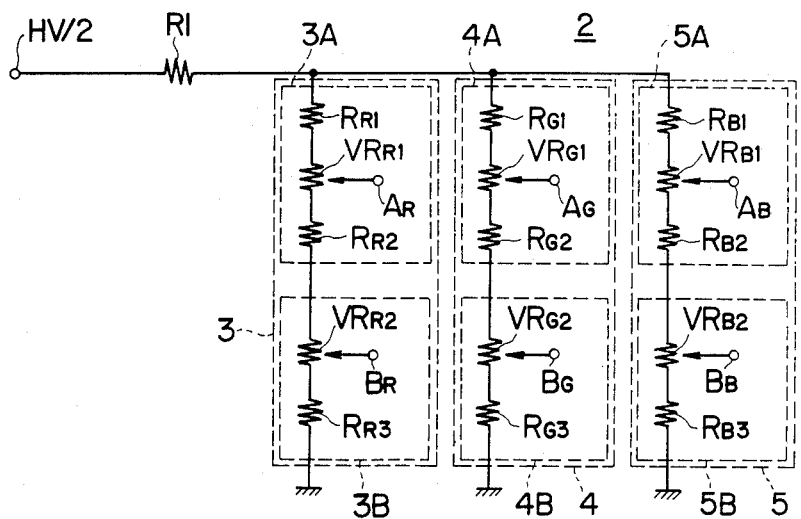
FIG. 4 is a circuit diagram of a conventional circuit.
Figure 5:
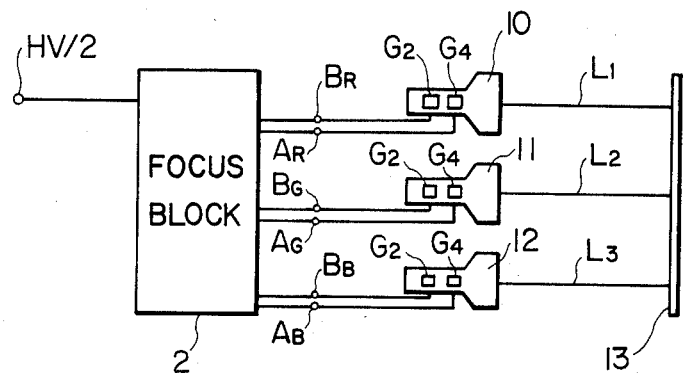
FIG. 5 a simplified circuit diagram for explaining the color video projector.
Figure 6:
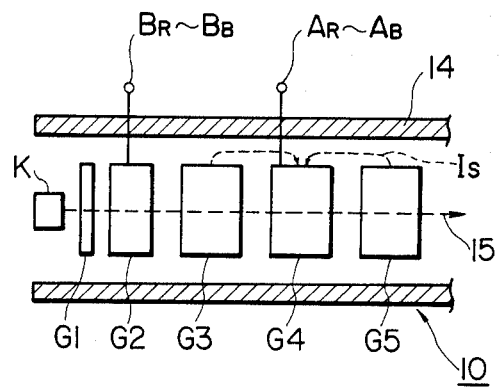
FIG. 6 is a schematic diagram for explaining the cathode-ray tube.

A first embodiment of the invention is shown in FIG. 1 in which the focus and brightness sections 3A, 3B, 4A, 4B, 5A and 5B are the same as shown in FIG. 4. The focus block 2 includes the brightness adjusting variable resistors $VR_{R2}$, $VR_{G2}$ and $VR_{B2}$ with variable wiper contacts. Intermediate connection points $C_R$, $C_G$ which are respectively between 3A, 3B, 4A, 4B and 5A and 5B are connected together so that the potential at the intermediate connection points $C_R$, $C_G$ and $C_B$ will be positively maintained at the same value.

In the circuit of FIG. 1, if a stray current $I_s$ occurs, for example, in the CRT 10 for the red color, the stray current $I_s$ will flow from the focus voltage output terminal $A_R$ of the focus adjusting circuit 3A for the red color through the focus adjusting variable resistor $VR_{R1}$ and the fixed resistor $R_{R2}$ to the intermediate connection point $C_R$. Since the intermediate connection point $C_R$ is connected by the connecting line LIN to the intermediate connection points $C_G$ and $C_B$ of the focus block sections 4 and 5 for the green and blue colors, the stray current will be divided into approximately the same values and will flow through the brightness adjusting variable resistor $VR_{R2}$ and the fixed resistor $R_{R3}$, the variable resistor $VR_{G2}$ and fixed resistor $R_{G3}$, and the variable resistor $VR_{B2}$ and the fixed resistor $R_{B3}$ to ground.

As a result, the voltage G2 obtained from the G2 voltage output terminals $B_R$, $B_G$ and $B_B$ of the brightness adjusting circuits 3B, 4B and 5B for the red, green and blue colors increases together according to the value of the stray current $I_s$, which prevents distortion phenomenon of the balance in practice. Moreover, the amount of the increases of the G2 voltage for each color in this case is about ⅓ as that of the increase of the conventional configuration because the stray current $I_s$ divides and the resultant current of about ⅔ is supplied to each section.

According to the configuration shown in FIG. 1, even if stray current occurs in any of the CRT's, changes in the color balance will be prevented by prior adjustment which makes it simple to provide a focus block 2 in which it is not necessary to readjust of the color balance during the operations.

Figure 2:
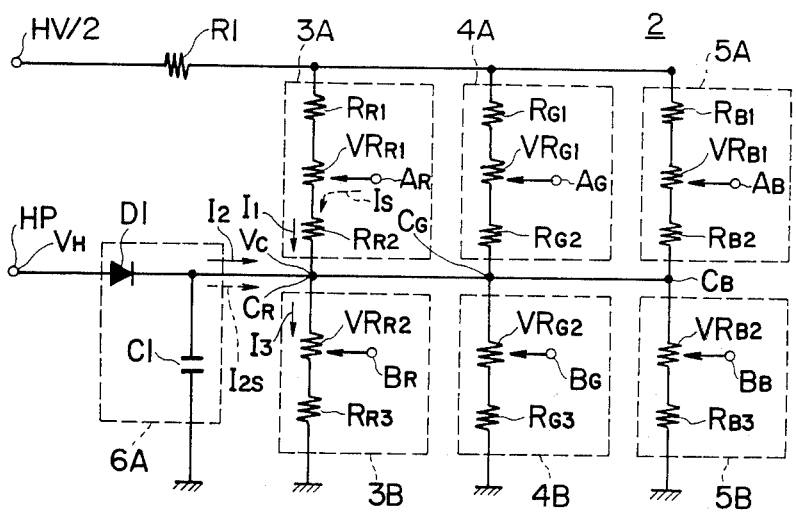
FIG. 2 is a circuit diagram showing a second embodiment of the present invention.

A second embodiment is illustrated in FIG. 2 in which the corresponding sections shown in FIG. 1 have the same reference numerals, and the respective intermediate connection points $C_R$, $C_G$ and $C_B$ of the focus block 2 are supplied with an adjusting current $I_2$ from a current adjusting circuit such that when a stray current $I_s$ flows, the current $I_3$ which flows from the respective intermediate connection points $C_R$, $C_G$ and $C_B$ into the brightness adjusting variable resistors $VR_{R2}$, $VR_{G2}$ and $VR_{B2}$ is maintained to have an approximately fixed value.

This results in a configuration which solves the problem where in the first embodiment, when a stray current $I_s$ occurs, the G2 voltage for each color increases by about ⅔ the conventional value in a linked operation and if the G2 voltage exceeds the allowable value as a result, it is necessary to readjust the brightness adjusting variable resistors $VR_{R2}$, $VR_{G2}$ and $VR_{B2}$ for the respective colors.

In the embodiment of FIG. 2, the current adjusting circuit includes a rectifier circuit 6A comprising a diode D1 and a capacitor C1 connected as shown with a capacitor C1 connected between ground and the common terminals $C_{R1}$, $C_G$ and $C_B$ and a diode D1 connected between the common terminals and an input terminal HP. The horizontal pulse signal HP which is to be supplied to the horizontal deflection coils for the red, green and blue colors (not shown) is rectifier by the rectifier circuit 6A, and transmits the resultant adjusting current $I_2$.

In the configuration of FIG. 2, the current passing the intermediate connection point $C_R$ in the ordinary condition when stray current $I_s$ is not present satisfies the following relationship as indicated by solid line arrows.

$$I_1 + I_2 = I_3 \tag{1}$$

In contrast, if stray current $I_s$ occurs, for example, in the CRT for the red color, the current which passes the intermediate connection point $C_R$ satisfies the following relationship as indicated with broken line arrows.

$$I_1 + I_s + I_{2S} = I_3 \tag{2}$$

In a range where the voltage $V_c$ appearing at the intermediate connection point $C_R$ when the predetermined horizontal pulse signal HP is not being supplied is lower than the voltage $V_H$ obtained by rectifying the horizontal pulse signal HP, an adjusting current $I_{2s}$ flows from the side of the horizontal signal HP is induced by the voltage $V_c$ at the intermediate connection point $C_R$, and the following relationship is satisfied.

$$I_{2s} = I_2 - I_s \tag{3}$$

Even if stray current $I_s$ occurs in one of the CRT's 10, 11 and 12 for the red, green and blue colors as shown by the equations (2) and (3), if the voltage changes including the voltage $V_c$ is in a range which is lower than voltage $V_H$, the current $I_3$ flowing in the brightness adjusting circuits 3B, 4B and 5B can be maintained at a fixed value and consequently, the voltage G2 appearing at the G2 voltage terminals $B_R$, $B_G$ or $B_B$ can be maintained at fixed values. Thus, in the embodiment of FIG. 2 as in the first embodiment of FIG. 1, even if stray currents or discharge phenomenons occur, distortion of the color balance can be prevented by adjusting the circuit beforehand. Incidentally, in the embodiment of FIG. 2 as compared to the first embodiment of FIG. 1, fluctuations of the G2 voltage can be prevented; and consequently upon an occurrence of stray current, readjustment of the variable contacts of the brightness adjusting variable resistors $VR_{R2}$, $VR_{G2}$ and $VR_{B2}$ of the focus block 2 are not necessary.

Figure 3:
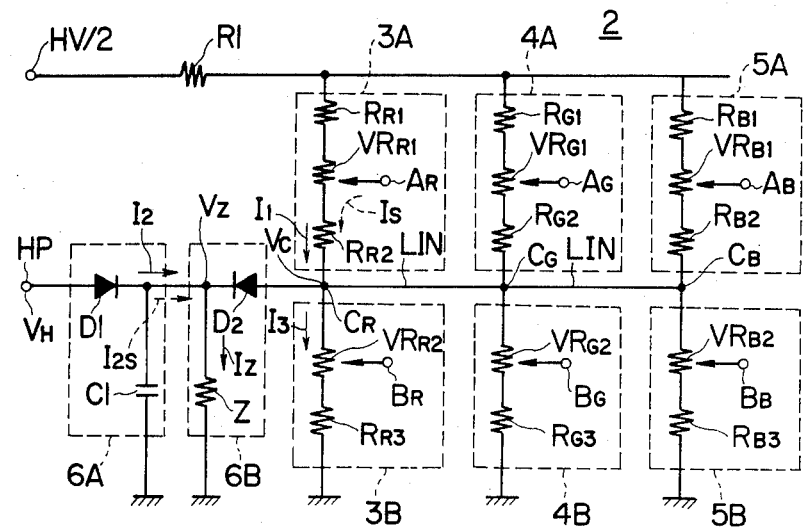
FIG. 3 is a schematic circuit diagram illustrating a third embodiment of the present invention.

A third embodiment is illustrated in FIG. 3 in which the corresponding sections shown in FIG. 2 have the same reference numerals. In this embodiment, the current adjusting circuit includes a rectifier circuit 6A comprising a diode D1 and a capacitor C1 connected as shown between terminal HP and ground and a voltage regulating circuit 6B comprising a diode D2 and a resistor Z connected between the rectifier circuit 6A and the intermediate connection points $C_R$, $C_G$ and $C_B$ of the focus block sections 3, 4 and 5. The diode D2 is connected in reverse polarity to diode D1 as shown. An adjusting current $I_2$ is supplied as shown so as to cause the flow of stray current $I_s$ which occurs to one side of the resistor Z.

Consequently, even when stray current $I_s$ flows in a range where the voltage $V_c$ which appears at the intermediate connection points $C_R$, $C_G$ and $C_B$ when the predetermined horizontal pulse signal is not being supplied is higher than the voltage $V_H$ which is obtained by rectifying the horizontal pulse signal HP, the current $I_3$ which flows from the respective intermediate connection points $C_R$, $C_G$ and $C_B$ into the brightness adjusting circuits 3B, 4B and 5B can be maintained at a fixed value.

In the ordinary state in this embodiment when stray current $I_s$ is not present, the current $I_z$ passing through the resistor Z satisfies the following condition.

$$I_z = I_1 + I_2 - I_3 \tag{4}$$

In contrast, when stray current $I_s$ occurs, for example, in the CRT 10 for the red color, the current $I_z$ passing through the resistor Z satisfies the following relationship.

$$I_z = I_1 + I_s + I_{2S} \tag{5}$$

This is because in the range where the voltage $V_c$ developed at the intermediate connection point $C_R$ when the predetermined horizontal pulse signal is not being supplied is higher than the voltage $V_H$ obtained by rectifying the horizontal pulse signal HP, the adjusting current $I_{2S}$ flowing from the horizontal pulse signal HP into the resistor Z is induced by the voltage $V_z$ occurring at the ungrounded side of the resistor Z according to the following formula.

$$I_{2s} = I_2 - I_s \tag{6}$$

Consequently, even when stray current $I_s$ occurs in one of the CRT's 10, 11, and 12 for the red, green and blue colors as represented by the expressions (5) and (6), the current $I_3$ flowing into the brightness adjusting circuits 3B, 4B and 5B can be maintained at a fixed value in a range where the voltage fluctuation including the voltage $V_c$ is higher than the voltage $V_H$, which allows the G2 voltage occuring at the G2 voltage terminals $B_R$, $B_G$ and $B_B$ to be maintained fixed.

According to the embodiment of FIG. 3, the effect which is similar to that obtained with the second embodiment can be obtained. Incidentally, in the second embodiment of FIG. 2, based on the relationships between the voltage level $V_H$, of the horizontal pulse signal HP and the voltage $V_c$ at the intermediate connecting points $C_R$, $C_G$ and $C_B$ when the predetermined horizontal pulse signal is not supplied, the circuit can be used only with a color video projector in which the voltage V of the horizontal pulse signal HP has a high level; however, in the embodiment of FIG. 3, the circuit can be adopted for general use with a color video projector in which the horizontal pulse signal HP has a relatively low level.

According to the present invention as described above, a simple circuit provides a focus block capable of effectively preventing fluctuations in the color balance caused by stray currents or by discharge phenomenon occuring in a CRT.

While the present invention has been described with reference to particular illustrative embodiments, it is not to be limited by those embodiments but only by the appended claims. It is to be appreciated that those skilled in the art can change or modify the embodiments without departing from the scope and spirit of the present invention.

We claim as our invention:

1. A focus block in a three-tube color video projector comprising separate focus block sections for the red, green and blue colors, each including a focus adjusting circuit and a brightness adjusting circuit which are connected together in series wherein; the intermediate connecting points between each of said focus adjusting circuits and each of said brightness adjusting circuits of the focus block sections are connected to each other.

2. A focus block according to claim 1 wherein the connected intermediate connecting points between the focus adjusting circuits and the brightness adjusting circuits for each of said focus block sections are supplied with a predetermined current from a current source.

3. A focus block according to claim 2 wherein said current source includes a current adjusting circuit and a voltage regulating circuit.

4. A circuit for automatically controlling focus and brightness in a three color video projector having red, green and blue cathode ray tubes each with electrodes for controlling the focus and brightness comprising, a voltage source, a red focus adjustment circuit with its input terminal connected to said voltage source and including at least one first resistor with one side connected to said input terminal of said red focus adjustment circuit and its other side connected to an output terminal and having a first wiper contact engageable with said first resistor and connected to the electrode for adjusting the focus of said red cathdoe ray tube, a red brightness adjustment circuit with its input terminal connected to the output terminal of said red focus adjustment circuit and including at least one second resistor with one side connected to said input terminal of said red brightness adjusted circuit and its other side connected to ground and having a second wiper contact engageable with said second resistor and connected to the electrode for adjusting the brightness of said red cathode ray tube, a green focus adjustment circuit with its input terminal connected to said voltage source and including at least one third resistor with one side connected to said input terminal of the green focus adjustment and its other side connected to an output terminal and having a third wiper contact engageable with said third resistor and connected to the electrode for adjusting the focus of said green cathode ray tube, a green brightness adjustment circuit with its input terminal connected to the output terminal of said green focus adjustment circuit and including at least one fourth resistor with one side connected to said input terminal of said green brightness adjustment circuit and its other side connected to ground and having a fourth wiper contact engageable with said second resistor and connected to the electrode for adjusting the brightness of said green cathode ray tube, a blue focus adjustment circuit with its input terminal connected to said voltage source and including at least one fifth resistor with one side connected to said input terminal of said blue focus adjustment circuit and its other side connected to an output terminal and having a fifth wiper contact engageable with said fifth resistor and connected to the electrode for adjusting the focus of said blue cathode ray tube, a blue brightness adjustment circuit with its input terminal connected to the output terminal of said blue focus adjustment circuit and including at least one sixth resistor with one side connected to said input terminal of said blue brightness adjustment circuit and its other side connected to ground and having a sixth wiper contact engageable with said sixth resistor, and connected to the electrode for adjusting the brightness of said blue cathode ray tube, and the output terminals of said red, green and blue focus adjustment circuits are connected together.

5. A circuit for automatically controlling the focus and brightness of a three color video projector according to claim 4 comprising a current source connected to the output terminals of said red, green and blue focus adjustment circuits.

6. A circuit for automatically controlling the focus and brightness of a three color video projector according to claim 5 wherein said current source comprises a diode which has one side connected to a voltage supply and its other side connected to said output terminals of said red, green and blue focus adjustment circuits and a capacitor connected between ground and said other side of said diode.

7. A circuit for automatically controlling the focus and brightness of a three color video projector according to claim 5 wherein said current source comprises first and second back to back connected diodes connected between a voltage supply and said output terminals of said red, green and blue focus adjustment circuits and a capacitor and a seventh resistor connected in parallel between ground and a junction point between said first and second diodes.

* * * * *